Patented Oct. 16, 1945

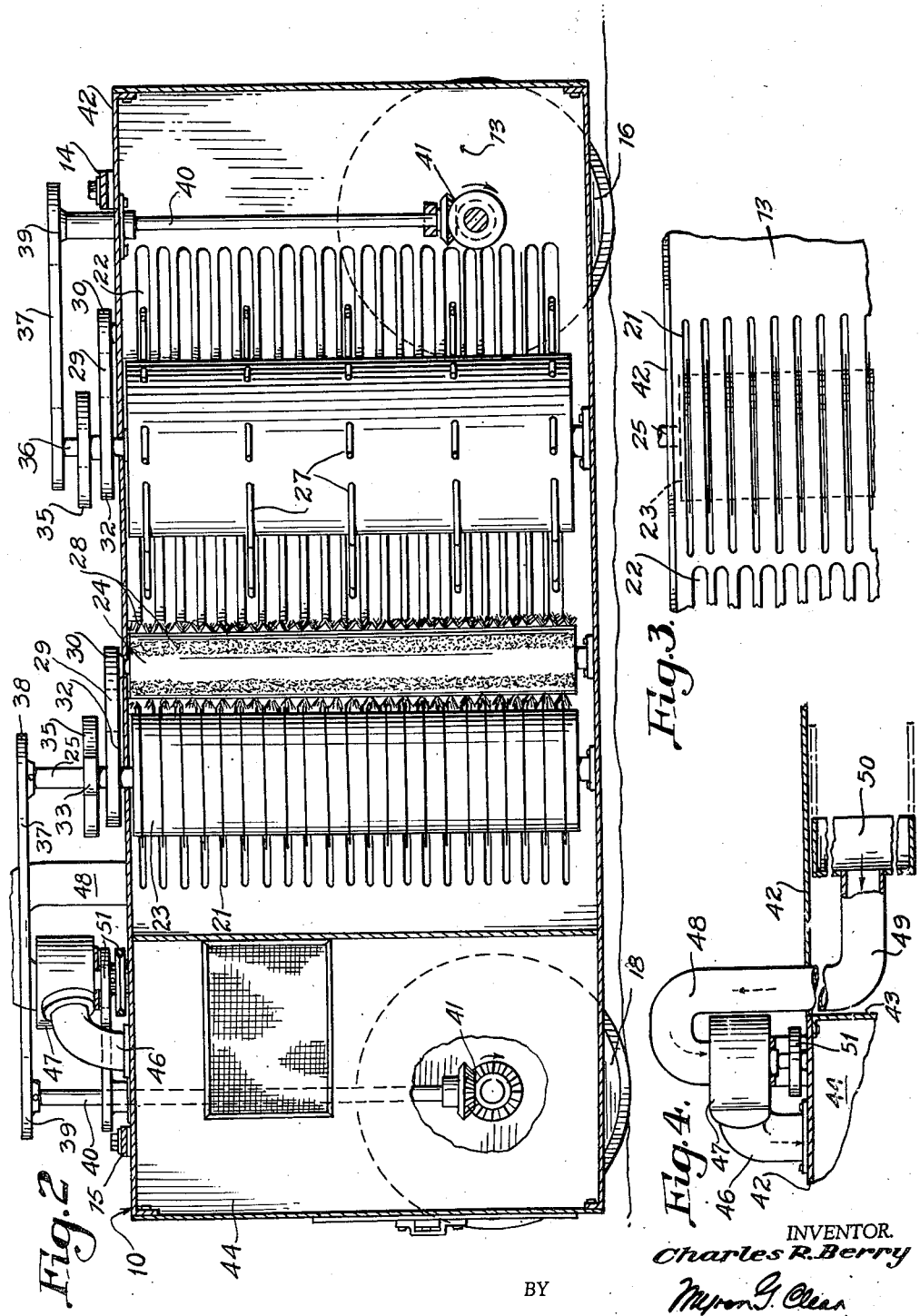

2,387,004

UNITED STATES PATENT OFFICE 2,387,004

COTTON HARVESTING MACHINE

Charles R. Berry, Vicksburg, Miss., assignor of one-half to Hugh A. Gamble, Greenville, Miss.

Application October 16, 1943, Serial No. 506,542

9 Claims. (Cl. 56—40)

The present invention relates generally to the harvesting of cotton which has heretofore been accomplished by hand pickers and by what are, strictly speaking, cotton picking machines. Both the hand picking and machine picking have, up to the present been accomplished during that period in which the cotton bolls or fibers are open and ripe and while the plants are green and in full leaf.

The cotton plant, in the above state, is very flexible, with sufficiently tough stalk and branches to withstand a very considerable amount of deformity without harm. Furthermore it is generally full-leaved, and in many localities, profusely leaved to the extent of covering from view much of the open bolls or fibers. Both hand picking and machine picking up to the present time have suffered from the full leaved condition of the plant at picking time since it is highly important that the fibers be harvested free of leaves, burrs and other trash.

The above is responsible for much of the complications of cotton picking machines proposed up to the present time, and recent developments prove that the difficulties and complications need not be further encountered and contended with, following the discovery that the cotton plant, at the maturity of the fiber, may be defoliated by chemical application, without harming the cotton fiber or lowering its grade, and without killing the plant.

The chemical defoliation of the cotton plant is accomplished at some time following maturity of the cotton fibers, or full opening of the cotton bolls, without killing the plant, and results in a naked plant which is still alive and pliant as to all of its remaining parts. It is, of course, to be accomplished within such a period before frost, which does kill the plant.

Denuded of leaves, all matured fibres of the cotton plant are exposed, and the present invention proposes a machine by means of which the thus exposed fibers may be readily and effectively harvested in a trash-free condition. This constitutes its primary object, with the further thought in mind of its very great advantage, from the standpoint of simplicity and practical workability, as compared to any successful picking machine for removing cotton from normally leaved cotton plants, and its further ruggedness in use and freedom from breakdowns and necessity for frequent repairs and substitution of parts.

In the accompanying drawings, in which a proposed means of accomplishing the practically effective harvesting of cotton fiber from defoliated cotton plants is substantially disclosed, and which form a part of this specification.

Figure 2 is a vertical, longitudinal sectional view taken generally along the line 2—2 of Figure 1.

Figure 3 is a detail fragmentary elevation of a portion of the apparatus looking along the line 3—3 of Figure 1, and Figure 4 is a detail fragmentary vertical sectional view taken substantially on line 4—4 of Figure 1.

Figure 1:
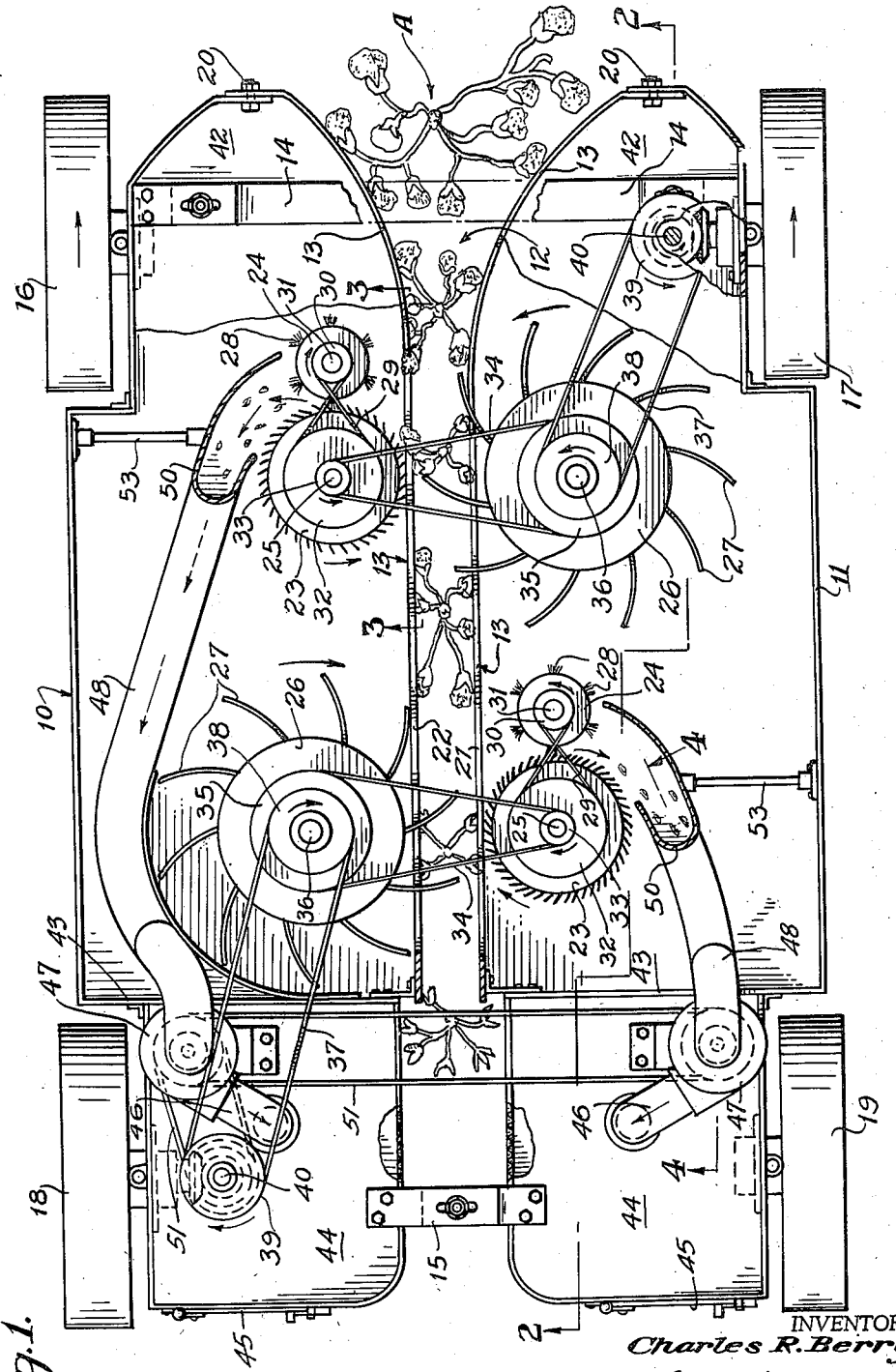
Figure 1 is a top plan view of a desirable structure, a portion of the top wall being removed and portions of the suction pipes being broken away, for better illustration.

Referring now to the above figures, the proposed apparatus is best shown in Figure 1, in a more or less diagrammatic manner as to various features including driving connections for the cotton removing and collecting means, as comprising a pair of lengthwise disposed and laterally spaced body members 10 and 11, so arranged as to receive between them a row of cotton plants generally indicated at A, to thus form a straddle-row harvester.

The lengthwise space or channel between these body members is indicated at 12 and is preferably such as to laterally compress the previously defoliated cotton plants A as they are received between the flaring forward ends of the inner opposing upright walls 13 of the body members. Since cotton plants vary in growth in different cotton producing regions, the body members 10 and 11 are preferably laterally, relatively adjustably, connected by adjustable connecting cross members 14 and 15 at the forward and rear ends of the body members, across the top walls thereof so as not to impede or interfere with the movement of the cotton plants rearwardly in the channel 12 as the machine progresses forwardly in the field.

In Figure 1, in which the top walls of the body members 10 and 11 are removed for exposing the internal working parts, the body members are shown as supported for movement on front and rear side wheels 16, 17, 18 and 19, it being contemplated in this outline of the invention that the machine may be horse drawn by any suitable draft hitches with the forward ends of the body members, at 20. It is obvious, that the machine may be of a tractor mounted type or, in other words, self-propelled, in a manner well known to those skilled in the art.

Rearwardly of their forward flaring ends, the inner walls 13 of the body members 10 and 11 are grid-like, being provided with vertical series of lengthwise slots 21 and 22 along opposite sides of the plant receiving channel 12, to a height at least equal to the height to which the largest cotton plants grow, so that as the plants traverse the channel they may be guided and alternately pressed laterally an more or less flatly against these slotted walls to cause projection of the fibers into the slots for ready removal of the fibers and withholding of the burrs and plant stems, in a manner and by the means to be now described.

At lengthwise spaced points, the body members 10 and 11 support therein cotton fiber removing and doffing units, each unit including an upright carding cylinder 23 and an adjacent cooperating doffing cylinder 24, and in each unit the carding cylinder 23 rotates on its vertical axis or shaft 25, so that its curved peripheral carding pins extend, at one side of the cylinder, closely adjacent to the outer adjacent face of the respective inner wall 13. It will be noted that of these units, of which but two units are shown in Figure 1, though there may be more, the carding cylinder 23 and its doffing cylinder 24 of the forward unit are mounted within the body member 10, and the carding cylinder 23 and its doffing cylinder 24 of the rear unit are mounted in the body member 11, so that these similar units are successively reversed to coact with the inner wall 13 of one body member and the inner wall 13 of the other body member.

Opposite each of the above units, and especially opposite each carding cylinder 23, is a vertically disposed plant guiding and propelling cylinder 26, journalled to rotate in the relatively opposite body member and provided with curved and preferably flexible, elastic plant engaging arms 27 arranged in vertically spaced horizontal series, peripherally outstanding therefrom and of a length to extend through the slots 22 of the adjacent wall 13 and substantially across the plant channel or passage 12.

Each carding cylinder 23 also has a small pulley 33 connected by a belt 34 with a larger pulley 35 on the shaft 36 of its respective, oppositely disposed plant guiding and propelling cylinder 26. Likewise each of the latter cylinders 26 is connected by a belt 37, around its pulley 38, to a pulley 39 on a vertical shaft 40 which has a geared connection 41 (see Figure 2), with one of the supporting wheels, the said connections of the forward unit proceeding from wheel 17, as shown in this instance, and the connections of the rear unit proceeding from wheel 18. These latter connections are such that the plant guiding and propelling cylinders 26 are rotated at the same relative speed as that of forward movement of the machine, and in a direction causing their arms 27 to sweep rearwardly in the plant channel 12, and in doing so, to guide and flatten the plants against a slotted wall portion 21 adjacent their respective carding cylinders 23, driving the carding cylinders at a comparatively higher speed. Each doffing cylinder 34 is driven at a still higher speed and in the relatively opposite direction of rotation by a drive belt 29 trained over a large pulley 32 on the shaft 25 and over a smaller pulley 30 on the shaft 31 of the doffing cylinder, the belt 29 being crossed between the two pulleys 25, 31.

During the above operation, and bearing in mind the plants have been defoliated, no portion of the plants, except portions of the cotton fibers can extend through the wall slots 21 within the effective influence of the carding cylinders. Also, since the carding teeth are curved in the direction of their rotation, it is only necessary for them to engage wisps of the cotton fiber in order that they may, by reason of relatively speedy rotation thereof, snatch the full fibers or bolls out of the burrs which are restrained within the plant channel. The result is that the cotton fibers are removed in a clean condition entirely free of leaves, burrs and plant stems and in such manner that immediately after their removal by the carding cylinders they may be effectively swept free of the latter by the action of the doffing cylinders 24.

It will be noted from Figure 2 that it is contemplated all of the above mentioned rotation transmitting belts and belt pulleys above referred to, are located above the top walls 42 of the body members 10 and 11, which top walls are removed from Figure 1, but are seen in Figure 2.

In Figure 1 are shown partition walls 43 across the rear portions of the body members 10 and 11, forming rear cotton fiber collecting compartments 44, from which collected cotton fiber may be unloaded from time to time, as for example, through rear unloading doors 45.

Into the above compartments it is contemplated cotton fiber may be loaded during operation of the machine, through the discharge conduits 46 of suction fans 47. These fans draw through suction pipes 48 which are connected at their forward downwardly offset ends 49, as seen in Figures 1 and 4, to suction shields 50 which extend, and are open, along portions of the carding cylinders 23 and doffing cylinders 24, opposite the point of removal, by the latter, of the fibers from the former. Thus the shields 50 catch the removed fibers in the presence of suction effecting their final discharge into the collecting compartments 44. The fans or blowers may be driven by gearing and/or connecting belts 51 from the rear upright shaft 40 before mentioned, or in any suitable manner from any other driving source available for this purpose. The shields 50 are to be suitably connected in the body members 10 and 11 and braced, as by means of braces 53.

Having thus fully described the invention, what is claimed is:

1. A cotton harvesting machine including movable supports for operation in the field, means forming a passageway for plants through the machine, including spaced wall members apertured for the lateral exposure of cotton fibers and adapted to laterally confine the plants within the passageway, means laterally of said passageway for removing exposed cotton fibers, and means for propelling cotton plants rearwardly in said passageway at the same relative speed at which the machine moves forwardly and laterally, yieldingly confining the plants opposite the cotton removing means, said propelling means comprising a rotatable member and a plurality of flexible elastic plant engageable arms attached thereto.

2. A cotton harvesting machine including movable supports for operation in the field, laterally opposed body members having inner spaced apart vertical walls defining a lengthwise passage-way through the machine for the rearward passage of cotton plants as the machine moves forwardly, said walls acting as shields for the plants and having openings through which cotton fibers may project, cotton removing means operating at the outer faces of said walls for removing fibers exposed through said openings, and means for guiding the plants through the passageway and laterally thereof opposite the cotton removing means, comprising a rotatable member having a plurality of flexible elastic plant engageable arms adapted to urge the fibers into said openings.

3. The combination set forth in claim 2 including the further provision of means for adjusting said body members laterally relative to each other to adjust the spacing between said walls and between said removing and guiding means.

4. A cotton harvesting machine including movable supports for operation in the field, laterally opposed body members having inner spaced apart walls defining a lengthwise passage-way through the machine for the rearward passage of cotton plants as the machine moves forwardly, said walls acting as shields for the plants and having openings through which cotton fibers may project into the body members, means operating within said body members at lengthwise spaced points and alternately opposite sides of the passageway for removing exposed fibers, and means also operating within said body members for guiding the plants through the passageway and yieldably, laterally confining the same opposite the fiber removing means, said guiding means comprising members rotatable about vertical axes and having flexible elastic plant engageable arms for urging fibers into said openings, said walls having horizontal slots accommodating movement of said arms into said passage-way to engage the plants therein.

5. In a wheeled cotton harvesting machine for operation in the field to effect the removal of cotton fibers from previously defoliated plants, adjustable means forming a lengthwise plant receiving channel therein adapted to laterally compress the plants passing through said channel, including a side wall having openings through which the fibers are exposed during passage of the plants through said channel, means isolated from the plant channel by said wall, for removing cotton fibers exposed through said openings, and means for propelling the plants rearwardly in said channel in accord with forward movement of the machine and effective to create additional lateral pressure against the plants opposite said fiber removing means, said propelling means consisting of a member rotatable about a generally vertical axis and having flexible elastic plant engaging arms operable in the said channel.

6. A cotton harvesting machine including movable supports for operation in the field, a pair of laterally spaced, substantially flat vertical walls defining a lengthwise passageway through the machine for the rearward passage of cotton plants as the machine moves forwardly, said walls acting as shields for the plants and at least one of said walls having a series of vertically spaced generally horizontal slots for receiving cotton fibers during passage of the plants, and cotton removing means disposed adjacent the opposite side of said one wall and comprising a member having teeth mounted thereon, said members being rotatable about a generally vertical axis to move said teeth substantially parallel with said slots.

7. A cotton harvesting machine including movable supports for operation in the field, a pair of laterally spaced, substantially flat vertical walls defining a lengthwise passageway through the machine for the rearward passage of cotton plants as the machine moves forwardly, said walls acting as shields for the plants and at least one of said walls having a series of vertically spaced generally horizontal slots for receiving cotton fibers during passage of the plants, and cotton removing means disposed adjacent the opposite side of said one wall and comprising a member having teeth mounted thereon, said members being rotatable about a generally vertical axis to move said teeth substantially parallel with said slots, and a rotatable plant guiding member adjacent the outer side of the other of said walls opposite said cotton removing means, said guiding member being rotatable about a generally vertical axis and having plant engageable arms for urging cotton fibers into said slots, said other wall having a series of vertically spaced horizontal slots accommodating movement of said arms into said passage-way to engage the plants therein.

8. A cotton harvesting machine including movable supports for operation in the field, a pair of laterally spaced, substantially flat vertical walls defining a lengthwise passage-way through the machine for the rearward passage of cotton plants as the machine moves forwardly, said walls acting as shields for the plants and at least one of said walls having a series of vertically spaced generally horizontal slots for receiving cotton fibers during passage of the plants, and cotton removing means disposed adjacent the opposite side of said one wall and comprising a carding cylinder disposed for rotation about a generally vertical axis and having a plurality of carding teeth mounted thereon and curving therefrom in the direction of rotation, and means for driving said cylinder in the direction to move the carding teeth forwardly adjacent said slotted wall against the movement of plants.

9. A cotton harvesting machine including movable supports for operation in the field, a pair of laterally spaced, substantially flat vertical walls defining a lengthwise passageway through the machine for the rearward passage of cotton plants as the machine moves forwardly, said walls acting as shields for the plants and at least one of said walls having a series of vertically spaced generally horizontal slots for receiving cotton fibers during passage of the plants, and cotton removing means disposed adjacent the opposite side of said one wall and comprising a carding cylinder disposed for rotation about a generally vertical axis and having a plurality of carding teeth mounted thereon and curving therefrom in the direction of rotation, and means for driving said cylinder in the direction to move the carding teeth forwardly adjacent said slotted wall against the movement of plants, and a rotatable plant guiding cylinder adjacent the outer side of the other of said walls opposite said carding cylinder, a plurality of flexible elastic arms mounted on said cylinder, said other wall being apertured to permit said arms to swing into and out of said passage-way, and means for driving said guiding cylinder in the direction to move said arms rearwardly through said passage-way to engage the plants and urge the cotton fibers into said horizontal slots in the wall.

CHARLES R. BERRY.